Patented Apr. 10, 1928.

1,665,781

UNITED STATES PATENT OFFICE.

CLIFF S. HAMILTON, OF LINCOLN, NEBRASKA, ASSIGNOR, BY MESNE ASSIGNMENTS, TO PARKE, DAVIS & COMPANY, OF DETROIT, MICHIGAN, A CORPORATION OF MICHIGAN.

ARSENICAL COMPOUND.

No Drawing.　Application filed March 17, 1924. Serial No. 699,891.

The present invention relates to improvements in the manufacture of aromatic arsonic acids of the type which may be designated generically by the formula

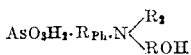

in which $R_{ph}$ may be a substituted or unsubstituted phenylene group, R may be a substituted or unsubstituted hydrocarbon residue and $R_2$ hydrogen or a substituting radical. Such substances may suitably be produced by reaction upon arsanilic acids with active residues of polyhydric alcohols; for example, as I have found, with halohydrins.

As simple examples of the compounds of my invention I may mention hydroxy-ethyl arsanilic acid and hydroxy-N-propyl arsanilic acid, the formulas of which may be represented respectively as

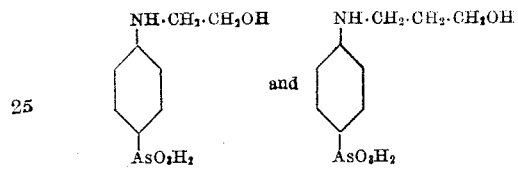

In the formulas illustrated the compounds derived from p-arsanilic acid are shown. Similar compounds may be prepared in which the substituted amino group is in other positions in the benzene nucleus, such as the following

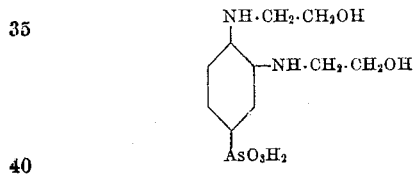

The substituting residue may contain the hydroxyl group in positions corresponding to secondary and tertiary alcohols and other substituting radicals may be present. Thus there may be prepared the following:

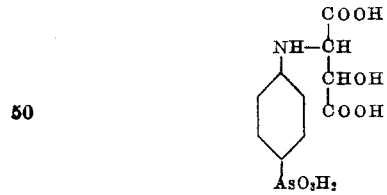

in which the OH group is in the secondary position and carboxyl groups are also present;

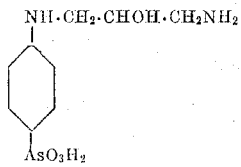

in which a primary amino group is present, and

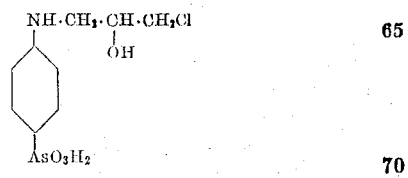

in which a chlorine atom is present in operation to form a chlorhydrin group. This compound may in turn be combined with arsanilic acid to form a compound containing two arsanilic acid residues:

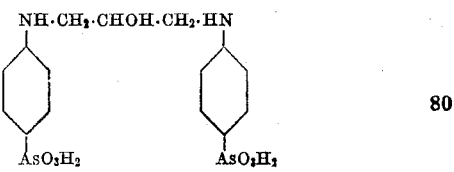

This compound may be considered one in which the hydrocarbon residue containing the hydroxyl group contains also a substituting arsanilic acid residue.

In general these compounds are white, crystalline more soluble in hot than in cold water, and form mono salts with the alkali metals, (e. g. sodium and ammonium) which are soluble in cold water.

A suitable method for the manufacture of these substances is, for example, the reaction upon an arsanilic acid with a halohydrin. For example, hydroxy-ethyl p-arsanilic acid may be obtained by reacting upon arsanilic acid (or a salt thereof) with ethylene chlorhydrin or bromhydrin, as follows:

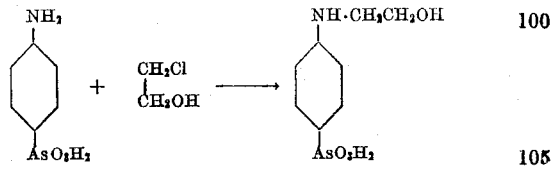

326 grams of arsanilic acid are dissolved in 1500 cc N sodium hydroxide solution; 181. grams about of ethylene chlorhydrin are added and the mixture boiled under a reflux condenser for 4 to 5 hours. On cooling colorless to white crystals separate out. The solution is acidified with HCl to hold unchanged arsanilic acid in solution, and the product is filtered off and washed with water. It may be recrystallized from hot water. It melts at 167 to 168° C., is soluble in alcohol and insoluble in ether and benzene. The mono-sodium and mono-ammonium salts are soluble in water and only slightly soluble or insoluble in alcohol.

By a similar procedure, using a trimethylene halohydrin, hydroxypropyl arsanilic acid was obtained:

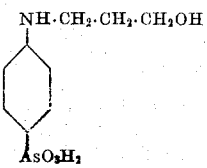

It forms colorless to white crystals, melting at 160–161° C., soluble in hot water and less soluble in cold water. It appears to have a higher trypanocidal action than the hydroxyethyl derivative.

I claim:

1. The method of preparing arsanilic acid derivatives which comprises reacting upon an arsanilic acid compound with a halohydrin, thereby introducing a hydroxyl containing group in its amino group.

2. The method of preparing an arsanilic acid derivative which comprises reacting upon a p-arsanilic acid compound with propylenechlorhydrin.

3. The method of preparing arsanilic acid derivatives which comprises reacting upon an arsanilic acid compound in aqueous solution with a halohydrin, thereby introducing a hydroxyl containing group in its amino-group.

4. The method of preparing arsanilic acid derivatives which comprises reacting upon an alkali metal compound of arsanilic acid in aqueous solution with a halohydrin, thereby introducing a hydroxyl containing group in its amino-group.

5. The method of preparing an arsanilic acid derivative which comprises reacting upon a p-arsanilic acid compound in aqueous caustic solution with propylenechlorhydrin.

CLIFF S. HAMILTON.